(No Model.)
J. H. BROWN.
CULTIVATOR.
No. 552,743. Patented Jan. 7, 1896.
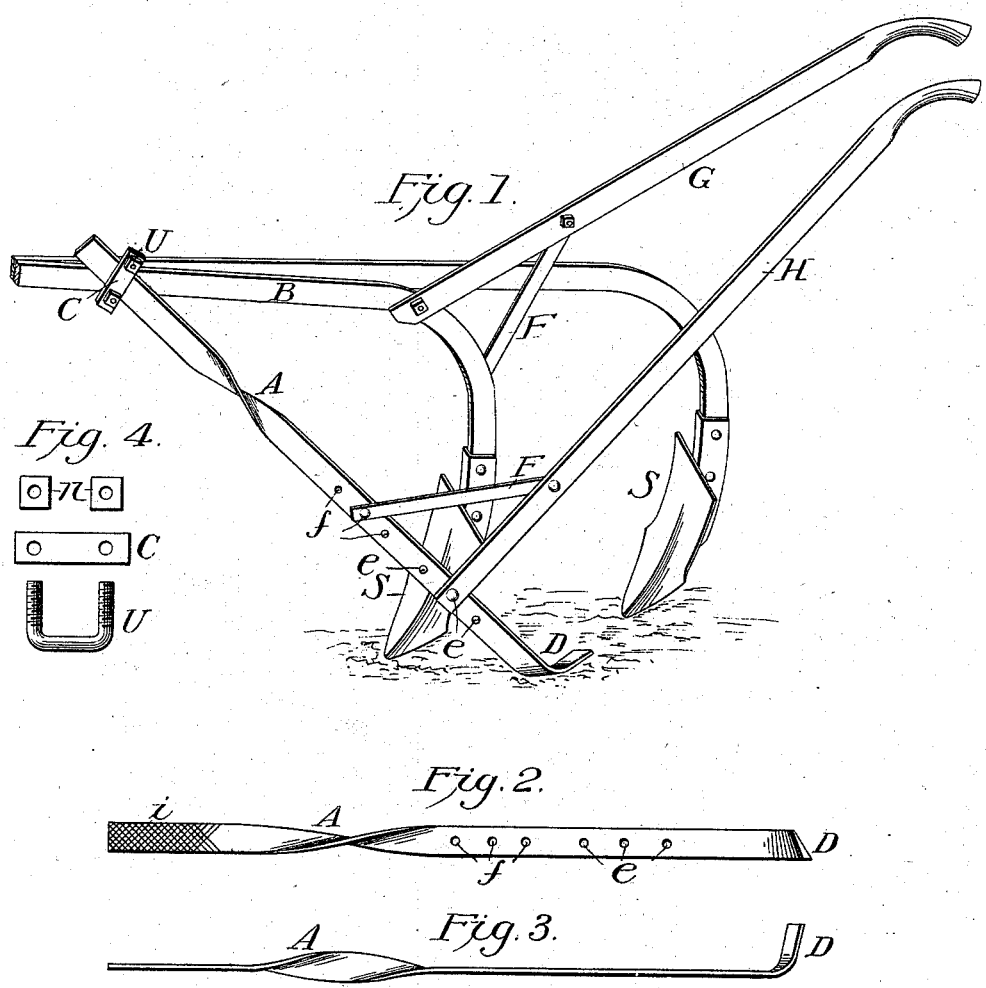
Witnesses.
Wm P Moore
C. C. Shiven
Inventor.
Justus H. Brown

UNITED STATES PATENT OFFICE.

JUSTUS H. BROWN, OF LINCOLN, NEBRASKA.

CULTIVATOR.

SPECIFICATION forming part of Letters Patent No. 552,743, dated January 7, 1896.

Application filed February 19, 1894. Serial No. 500,748. (No model.)

*To all whom it may concern:*

Be it known that I, JUSTUS H. BROWN, a citizen of the United States, residing at Lincoln, in the county of Lancaster and State of Nebraska, have invented a new and useful Improvement in Cultivators for Corn or other Crops, of which the following is a specification.

My improvement is more especially adapted to that class of cultivators known as "double" or "two-horse" cultivators; and the object of my improvement is to provide for destroying the weeds and slightly stirring the soil very near to and between the hills or plants while at the same time using the ordinary shovels for deep cultivation at a little greater distance from the plants. I attain these objects by the devices shown in the accompanying drawings, in which—

Figure 1 is a perspective view of one gang of a cultivator with my improvement attached. Fig. 2 is a view of one side of my steel-cutter attachment, showing the roughened surface where the same is secured to the cultivator-beam. Fig. 3 is another view of the same, showing more particularly the bend at the foot. Fig. 4 shows the detached parts of the clevis with which my improved cutter is attached to the cultivator-beam.

Similar letters refer to like parts throughout.

The cutter A is made of spring-steel and attached to the beam of the inner shovel of each gang of an ordinary two-horse cultivator by means of a clevis U, which is shown, together with its binding-bar C and nuts $n\ n$, in Fig. 4. The inner surface of the cutter A is roughened at the part where it is bound upon the beam by the clevis U, as shown at $i$, Fig. 2, so that when adjusted to the proper position it is firmly held in place by the clevis. The cutter A is twisted once around, so as to give the requisite elasticity vertically as well as horizontally, and is bent inward at the foot toward the gang to which it is attached. This foot or horizontal portion D is made sharp and is set at a proper angle to the earth near the surface, and thus destroys weeds and loosens the soil.

The handle H is bolted to the cutter A through one of the holes $e\ e\ e$ and is stayed by the brace E, which can also be adjusted by bolting at either of the holes $f\ f\ f$ to the cutter A.

The usual handle of the cultivator, (shown at G,) with its stay-brace F, may be left on if desired, but should preferably be removed and the gangs allowed to follow their natural course, with only such incidental guiding as may be afforded in guiding the cutters A. In cases where the handle G and brace F are of suitable length they may be used in place of the handle H and brace E, thus saving the cost of these articles in applying my attachment.

In operation the cutters A are run quite close to the plants and can readily be drawn together by the operator so as to cut all weeds, even between the hills, when by releasing the pressure upon the handles they will at once spring away from the hill or plant if desired. By this means, and by reason of the lightness and elasticity of these cutters, the labor of guiding the cultivator will be very much decreased, while its efficiency in the destruction of weeds near the plants and between the hills will be very greatly increased.

Having thus fully described my invention, I claim—

1. The elastic curved cutter A, rigidly attached to the beam B of a cultivator and provided with a handle H by which the cutter, owing to its elasticity, may be guided independently of the cultivator but will return to its normal position when the pressure on the handle is removed.

2. In combination with a double cultivator the weed cutter A with curved cutting foot D, handle H and fastening clevis U, the cutter being made of spring steel spirally twisted to give the requisite elasticity both vertically and horizontally substantially as set forth.

JUSTUS H. BROWN.

Witnesses:
P. JAS. COSGRAVE,
A. ROBERTS.